United States Patent
Farrar et al.

(10) Patent No.: US 6,419,298 B2
(45) Date of Patent: Jul. 16, 2002

(54) WINDOW PROTECTOR ASSEMBLY

(75) Inventors: Jerry L. Farrar, Banning; Dale E. Carson, Murrieta, both of CA (US)

(73) Assignee: Transit Care, Inc., Murietta, CA (US)

( * ) Notice: Subject to any disclaimer, the term of this patent is extended or adjusted under 35 U.S.C. 154(b) by 0 days.

(21) Appl. No.: 09/819,590

(22) Filed: Mar. 27, 2001

Related U.S. Application Data (63) Continuation-in-part of application No. 09/397,748, filed on Sep. 16, 1999, now Pat. No. 6,206,453
(60) Provisional application No. 60/244,402, filed on Oct. 30, 2000.

(51) Int. Cl.[7] .................................................. B60J 1/10
(52) U.S. Cl. ........................ 296/146.15; 296/146.16; 296/146.1; 49/504
(58) Field of Search ................. 296/146.15, 146.16, 296/95.1, 201, 146.1; 49/504; 52/768, 204.66

(56) References Cited

U.S. PATENT DOCUMENTS

| | | |
|---|---|---|
| 1,533,731 A | 4/1925 | Foley |
| 1,828,515 A | 10/1931 | Stone |
| 1,945,742 A | 2/1934 | Hilger |
| 1,973,792 A | 9/1934 | Barrows |
| 1,977,899 A | 10/1934 | Shapiro et al. |
| 2,163,566 A | 6/1939 | Blessin |
| 2,221,005 A | 11/1940 | Reese |
| 2,267,542 A | 12/1941 | Walz |
| 2,371,430 A | 3/1945 | de Patto |
| 2,667,378 A | 1/1954 | Holme-Shaw |
| 3,004,305 A | 10/1961 | Goodemote et al. |
| 3,025,098 A | 3/1962 | Andrews |
| 3,140,115 A | 7/1964 | Bliss |
| 3,266,560 A | 8/1966 | Mooskian |
| 3,312,023 A | 4/1967 | Zell |
| 3,599,596 A | 8/1971 | Remus et al. |
| 3,656,798 A | 4/1972 | Dodgen et al. |
| 3,686,795 A | 8/1972 | La Barge |
| 3,704,563 A | 12/1972 | Waller |
| 3,774,363 A | 11/1973 | Kent |
| 3,869,198 A | 3/1975 | Ballentine |
| 3,923,339 A | 12/1975 | McDonald |
| 3,925,947 A | 12/1975 | Meyers et al. |

(List continued on next page.)

FOREIGN PATENT DOCUMENTS

| | | |
|---|---|---|
| DE | 2038176 | 9/1971 |
| EP | 106 629 | 4/1984 |
| GB | 715795 | 9/1954 |

*Primary Examiner*—Ken Patel
(74) *Attorney, Agent, or Firm*—Knobbe, Martens, Olson & Bear, LLP.

(57) ABSTRACT

A window protector assembly that protects both the inside and outside of standard panes of glazing from vandalism or other damage. The assembly comprises a pane of glazing, a sheet of protective material on the inside and outside of the glazing, and a frame. The frame pivots on the outer side of the glazing for quick loading and unloading of the glazing and the protective sheet on the outside of the glazing, and the frame also pivots closed to seal the glazing and protective sheets securely within the window protector assembly. The frame also comprises a recess wherein the protective sheet on the inside of the glazing is positioned.

20 Claims, 9 Drawing Sheets

U.S. PATENT DOCUMENTS

| | | | |
|---|---|---|---|
| 3,959,941 A | 6/1976 | Smith | |
| 3,971,178 A | 7/1976 | Mazzoni et al. | |
| 4,196,545 A | 4/1980 | Korany et al. | |
| 4,205,486 A | 6/1980 | Guarnacci | |
| 4,248,018 A | 2/1981 | Casamayor | |
| 4,261,649 A | 4/1981 | Richard | |
| 4,280,414 A | 7/1981 | Allshouse et al. | |
| 4,292,771 A | 10/1981 | Ellis | |
| 4,328,644 A | 5/1982 | Scott | |
| 4,331,359 A | 5/1982 | Sheldon | |
| 4,332,412 A | 6/1982 | Nakazawa et al. | |
| 4,333,283 A * | 6/1982 | Ebata .................. | 49/504 |
| 4,349,993 A | 9/1982 | Tanaka et al. | |
| 4,358,488 A | 11/1982 | Dunklin et al. | |
| 4,364,209 A | 12/1982 | Gebhard | |
| 4,364,595 A | 12/1982 | Morgan et al. | |
| 4,430,831 A | 2/1984 | Kemp | |
| 4,474,403 A | 10/1984 | Miller | |
| 4,478,003 A | 10/1984 | Flett | |
| 4,494,342 A | 1/1985 | Decker | |
| 4,543,283 A | 9/1985 | Curtze et al. | |
| 4,555,867 A * | 12/1985 | Stibolt .................. | 49/504 |
| 4,555,869 A | 12/1985 | Kenkel | |
| 4,562,666 A | 1/1986 | Young, III | |
| 4,663,885 A * | 5/1987 | Stibolt .................. | 49/504 |
| 4,673,609 A | 6/1987 | Hill | |
| 4,726,149 A | 2/1988 | Tryba | |
| 4,763,454 A | 8/1988 | Brockhaus | |
| 4,768,823 A | 9/1988 | Martinez | |
| 4,823,511 A | 4/1989 | Herliczek et al. | |
| 4,940,622 A | 7/1990 | Leavitt, Sr. et al. | |
| 4,967,507 A | 11/1990 | Vismic et al. | |
| 4,989,912 A | 2/1991 | Furman | |
| 4,991,349 A | 2/1991 | Barthelemy | |
| 5,002,326 A | 3/1991 | Westfield et al. | |
| 5,046,284 A | 9/1991 | Harper | |
| 5,050,348 A | 9/1991 | Kane et al. | |
| 5,062,248 A | 11/1991 | Kunert | |
| 5,081,793 A | 1/1992 | Mauro | |
| 5,101,596 A | 4/1992 | Moore | |
| 5,150,943 A | 9/1992 | Gold | |
| 5,169,205 A * | 12/1992 | James .................. | 296/146.16 |
| 5,176,420 A | 1/1993 | Kato | |
| 5,242,207 A * | 9/1993 | Carson et al. ......... | 296/146.15 |
| 5,396,746 A | 3/1995 | Whitmer | |
| 5,525,177 A | 6/1996 | Ross | |
| 5,546,704 A | 8/1996 | Maruoka | |
| 5,584,526 A | 12/1996 | Soldner | |
| 5,609,938 A | 3/1997 | Shields | |
| 5,671,491 A | 9/1997 | Ladd | |
| 5,679,435 A | 10/1997 | Andriash | |
| 5,735,089 A | 4/1998 | Smith et al. | |
| 5,768,837 A | 6/1998 | Sjoholm | |
| 5,778,599 A | 7/1998 | Saito | |
| 5,809,707 A * | 9/1998 | Bargados et al. ...... | 296/146.15 |
| 5,848,496 A | 12/1998 | Bertolini et al. | |
| 5,893,600 A * | 4/1999 | McManus .............. | 296/146.16 |
| 5,907,927 A | 6/1999 | Lieb et al. | |
| 6,007,899 A * | 12/1999 | Yoshizawa et al. ...... | 296/146.1 |
| 6,131,339 A | 10/2000 | Ramus | |
| 6,164,715 A * | 12/2000 | Mosaner ................ | 296/146.15 |
| 6,205,723 B1 | 3/2001 | Farrar et al. | |
| 6,206,453 B1 * | 3/2001 | Farrar et al. .......... | 296/146.15 |
| 6,286,891 B1 * | 9/2001 | Gage et al. ............ | 296/146.15 |
| 2001/0032422 A1 * | 10/2001 | Farrar .................. | 296/146.15 |

* cited by examiner

WINDOW PROTECTOR ASSEMBLY

RELATED APPLICATIONS

This application is a continuation-in-part of U.S. patent application Ser. No. 09/397,748, filed Sep. 16, 1999, U.S. Pat. No. 6,208,453 entitled "WINDOW PROTECTOR ASSEMBLY," which is hereby incorporated in its entirety. This application also claims the benefit of U.S. Provisional Application Serial No. 60/244,402 filed Oct. 30, 2000.

BACKGROUND OF THE INVENTION

1. Field of the Invention

The present invention relates to protective devices for protecting windows from damage and, more specifically, concerns a replaceable window protector assembly adapted to both protect glazing used in windows in public transportation vehicles and also allow for the replacement of the same.

2. Description of the Related Art Vandalism of windows in public transportation vehicles has been an on-going problem for decades. Vandals cause damage by writing or painting on the glazing of the window with marking pens or spray paint. Further, vandals often damage the exposed glazing of the window by scratching the glazing with sharp instruments.

Oftentimes, the vandal is a passenger that damages the interior surface of the glazing. However, the exterior surface of the glazing on public transportation vehicles are increasingly being defaced or vandalized. It will be appreciated that the vandalism usually takes the form of crude or otherwise disagreeable expressions being permanently marked onto the windows. Hence, there is an on-going problem of vandalism and defacement of public transportation vehicles and, in particular, damage or defacement of both the interior and exterior surfaces of the glazing of these windows.

Likewise, unintentional breaking or fracturing of the glazing on public transportation vehicles has been an on-going problem as well. Oftentimes, road debris, interior debris, or passengers may accidentally strike the glazing with enough force to break or fracture it. Broken glazing presents an unacceptable hazard to passengers because the broken glazing can cut them. Also, fractured windows are unattractive and might cause a carrier to lose respect and business. Also, broken and fractured windows diminish the climate control capabilities of public transportation vehicles. Simply put, broken and fractured glazing must be replaced as soon as possible, but removal of the glazing is difficult and expensive. Hence, there is an on-going problem with the difficulty of replacing the glazing on public transportation vehicles.

To address these problems, various devices have been developed. For example, U.S. Pat. No. 5,242,207, which is owned by the assignee of this application, discloses one type of window protector which protects the interior surface of the glazing of the window from damage as a result of vandalism or defacement. In particular, U.S. Pat. No. 5,242,207 discloses a window protector which includes a protective sheet positioned against the interior surface of the glazing of the window and is held in place by a plurality of brackets which is attached to the frame of the window. This protective sheet acts as a sacrificial surface that protects the glazing of the window from damage as a result of vandalism or defacement. Whenever necessary, the protective sheet can be replaced with a new protective sheet by removing the brackets and positioning the new protective sheet adjacent the inner surface of the glazing of the window.

While the window protector disclosed in U.S. Pat. No. 5,242,207 has been effective in protecting the interior surface of the glazing of the window, this window protector does not provide protection against damage to the outer surface of the glazing of the window. Also, removing the interior protective sheet from the window protector disclosed in U.S. Pat. No. 5,242,207 requires of the retention brackets, and this process can increase the cost of maintenance and repair.

Moreover, the window protector disclosed in U.S. Pat. No. 5,242,207 is designed to be used in conjunction with the existing window frames of the transportation vehicle. These frames are not designed for quick glazing installation and are rigidly attached to the vehicle. Thus, when the glazing breaks, the broken pieces must be gathered from within the rigid frame, the entire frame must be removed from the vehicle and disassembled, new glazing must be inserted into the frame, the frame must be reassembled, and the entire assembly must be reinstalled into the vehicle. This tedious process can increase the cost of maintaining and repairing the public transportation vehicle windows.

From the foregoing, it will be appreciated that there is a need for an improved window protector that is capable of protecting both the interior surface and the exterior surface of the glazing of the window from damage as a result of vandalism or accident. It will also be appreciated that there is a need for an improved window protector that allows its owner to quickly replace both protective layers and the glazing in response to damage caused by vandalism or accident. To this end, there is a need for a window protector that provides protection to the window glazing on both the interior and exterior surfaces of the glazing and also allows for easy and quick access to the protective layers and the glazing itself.

SUMMARY OF THE INVENTION

The aforementioned needs are satisfied by the window protector assembly of the present invention, which protects the interior and exterior of the glazing while also allowing for quick installation and removal of the glazing and protective components.

In one aspect, the window protector assembly comprises a frame adapted to be positioned within the wall of a vehicle. The frame includes a pivoting member that can pivot on the exterior of the vehicle from an open to a closed position. In the closed position, the pivoting member retains a sheet of glazing and a protective sheet mounted on the outer surface of the glazing. In the open position, the glazing and the protective layer can be removed or installed. The window protector assembly also comprises a recess on the interior side of the assembly wherein a protective layer can be positioned on the interior side of the glazing.

More specifically, the window protector assembly comprises a frame that is adapted to be positioned within the wall of a vehicle wherein the frame includes a transverse surface that extends through an opening in the wall. The frame defines a window opening and an external perpendicular surface that is positioned adjacent the external surface of the wall of the vehicle when the frame is positioned within the wall. This frame defines a glazing mounting location on the transverse surface when the frame is positioned in the wall of the vehicle.

The window protector assembly also comprises a piece of glazing positioned at the glazing mounting location within the frame so as to occupy the window opening. The glazing mounting location is configured so as to inhibit the piece of glazing from moving inwards towards the interior surface of the wall of the vehicle. However, the mounting location permits the piece of glazing to be removed from the frame adjacent the exterior surface of the wall of the vehicle when the frame is positioned within the wall of the vehicle.

The window protector assembly further comprises at least one retaining member pivotally attached to the frame so as to pivot outward from the exterior surface of the vehicle when the frame is positioned within the wall of the vehicle. More specifically, the retaining member is movable between an open position and a closed position. When the retainer is in the open position, the piece of glazing can be removed from the window opening of the frame adjacent the exterior surface of the wall of the vehicle. When in the closed position, the retaining member retains the piece of glazing in the glazing mounting location.

As stated, the present invention is also a method for protecting glazing in vehicle windows. The first step of this method is to mount the glazing in the window frame from an exterior surface of the vehicle as detailed above. Then, the method continues by securing the glazing in the window frame by manipulating the pivoting member attached to the window frame adjacent the external surface of the vehicle. This second step secures the glazing against a surface in the window frame and inhibits the glazing from falling from the exterior of the vehicle. A last step involves positioning a protective sheet adjacent to an interior surface of the vehicle so as to inhibit damage to the surface of the glazing adjacent the interior of the vehicle.

Thus, the window protector assembly protects the glazing because the protective sheets mounted on both sides of the glazing will take the brunt of any damage or defacement directed at the glazing. The pivoting member also allows for quick replacement of the glazing and protective layers. These and other objects of the present invention will become more fully apparent from the following description taken in conjunction with the accompanying drawings.

DETAILED DESCRIPTION OF THE PREFERRED EMBODIMENT

Figure 1:
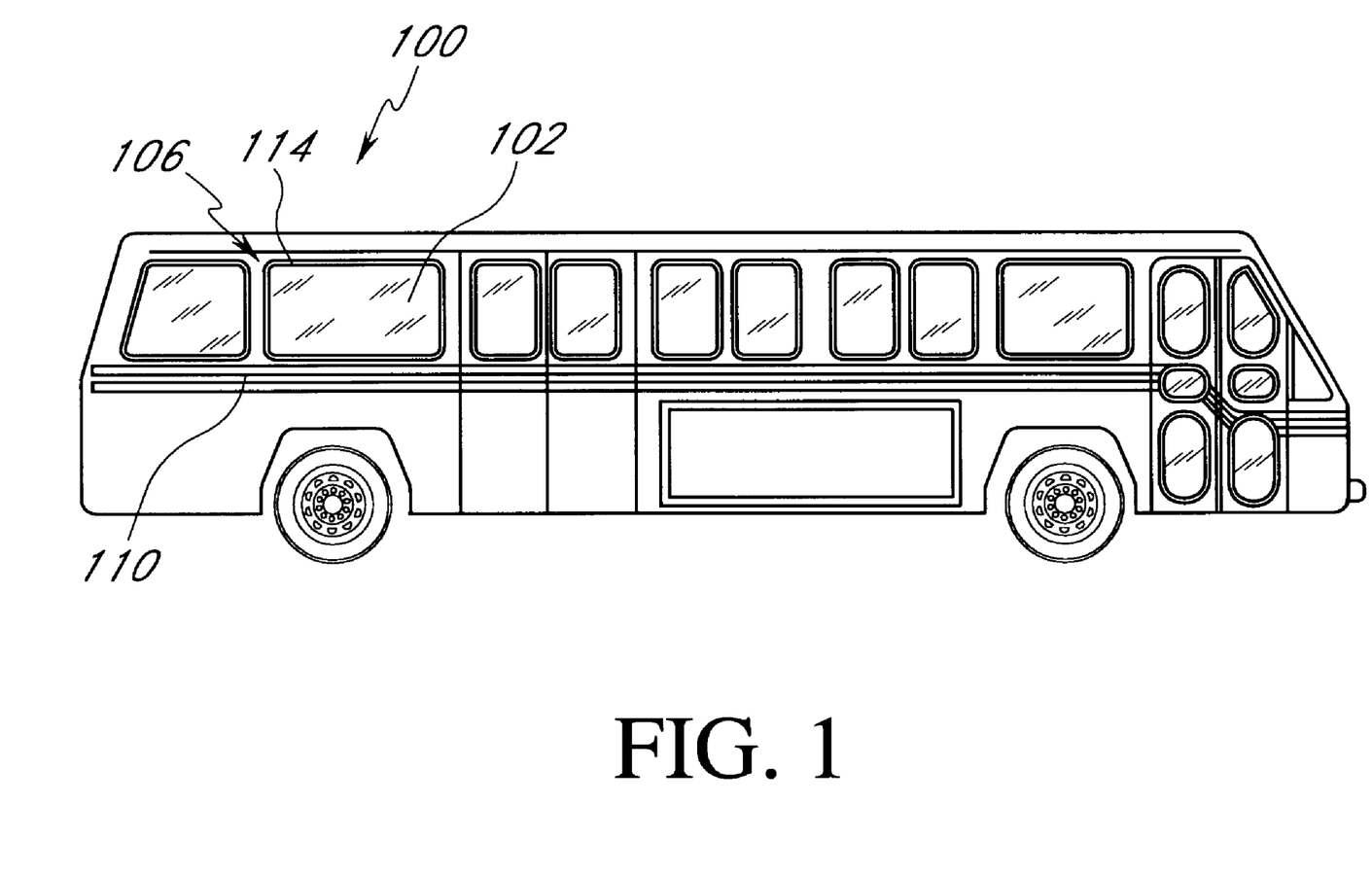
FIG. 1 is an elevational view illustrating a public transportation vehicle incorporating windows having an embodiment of a window protector assembly of the present invention.

Reference will now be made to the drawings wherein like numerals refer to like parts throughout. FIG. 1 illustrates an exemplary public transportation vehicle 100 that incorporates windows 102 having window frames 114 mounted within openings 106 in the side wall 110 of the vehicle 100. It will be appreciated from the following discussion that, while the window protector assembly of this embodiment is described in connection with a bus, that the window protector assembly 112 can be used in a number of different applications including other types of public transportation vehicles and also in windows that are positioned in fixed environments, such as buildings, where the window is likely to be damaged or defaced due to vandalism or accident. As will be also apparent from the following discussion, the window protector assembly of the preferred embodiment is designed to both protect the glazing of the window and also to facilitate rapid change and replacement of protective sheets and the glazing of the window protector assembly.

Figure 2:
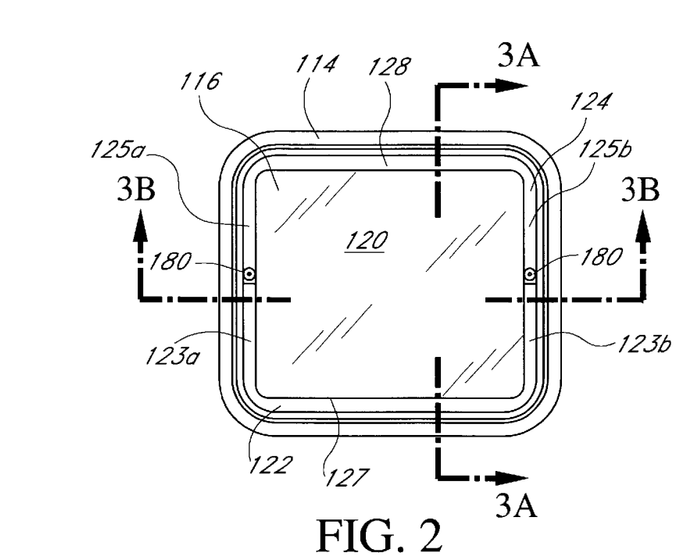
FIG. 2 is an inside elevational view illustrating the window protector assembly of FIG. 1.

Referring to FIG. 2, one embodiment of a window protector assembly 112 is illustrated. In this embodiment, the window protector assembly 112 incorporates a frame 114 that is adapted to mount within the opening 106 in the side wall 110 of the vehicle 100 in a well-known manner. The frame 114 defines an opening 116 into which one or more pieces of glazing 120 are to be positioned. As will be understood, the term "glazing" refers to either glass windows or windows formed of any other generally transparent or translucent material.

In this embodiment, a first retaining member 122 and a second retaining member 124 are pivotally mounted to the frame 114 so as to be positioned about the outer perimeter of the opening 116 in the frame 114. As is shown in FIG. 2, the first retaining member 122 is generally U-shaped having two arms 123a, 123b that extend along the side walls of the frame 114 and pivoting section 127. Similarly, the second retaining member 124 is also generally U-shaped having a pivoting section 128 and two arms 125a, 125b that also extend along the side walls of the frame 114 so as to engage with the two arms 123a, 123b of the first retaining member 122. The engagement between the arms 123a, 123b of the first retaining member 122 and the arms 125a, 125b of the second retaining member 124 secures the glazing and protective layers within the opening 116 of the frame 114 in a manner that will be described in greater detail below.

As will also be described in greater detail below in reference to FIGS. 5A and 5B, the pivoting section 127 of the first retaining member 122 and the pivoting section 128 of the second retaining member 124 are pivotally attached to the frame 114 so as to be pivotable between a closed position, as shown in FIG. 2, and an opened position whereby the outer perimeter of the glazing 120 and any protective layer is exposed. As is shown in FIG. 2, the arms and pivoting sections of the first retaining member 122 and the second retaining member 124 are selected to have a width sufficient so as to fully cover the outer edge of the glazing 120 and any protective layers positioned within the opening 116 of the frame 114.

Figure 3A:
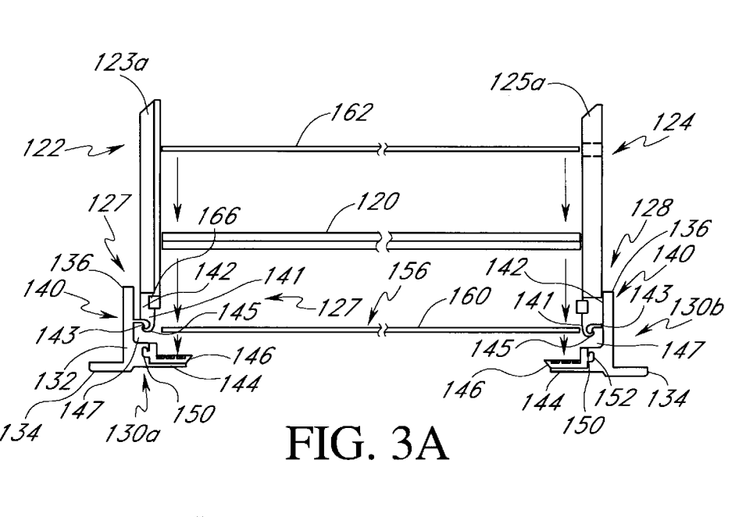
FIGS. 3A and 3B are cross-sectional views of the window protector assembly of FIG. 2 taken along the lines of 3—3.
Figure 3B:
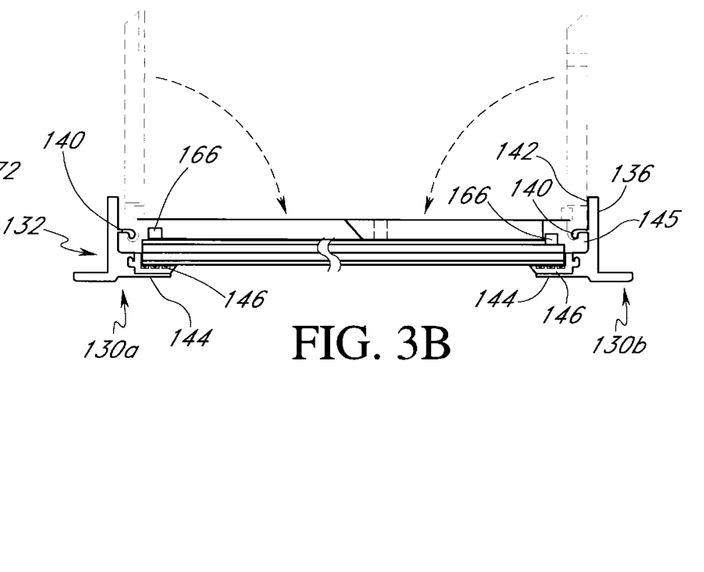

FIGS. 3A and 3B illustrate the interconnection between the first retaining member 122 and the second retaining member 124 and corresponding sections of the frame 114. In particular, as illustrated in FIGS. 3A and 3B, the frame 114 includes an upper frame section 130a and a lower frame section 130b. The upper and lower frame sections 130a, 130b have an L-shaped section 132 that is suitable for mounting in the opening 106 of the side wall 110 of the vehicle 100. In particular, the L-shaped section 132 has an exterior lip 134 that is adapted to mount flush against the outer surface of the side wall 110 of the vehicle adjacent the window openings 106. The L-shaped section 132 further includes a laterally extending member 136 that is adapted to be positioned adjacent the inner walls of the openings 106 in the side walls 110 of the vehicle so as to extend substantially through the opening 106.

A pivoting member 140 is formed on an inner wall 142 of the laterally extending member 136 so as to extend perpendicularly outward therefrom into the opening 116 defined by the frame 114. As will be described in greater detail below, the pivoting member 140 extends the full length of the upper frame section 130a and the lower frame section 130b, and provides a surface to which the pivoting section 127 of the first retaining member 122 and the pivoting section 128 of the second retaining member 124 can be respectively attached to the frame 114 of the window protector assembly 112.

The L-shaped section 132 also defines a seating member 144 that extends inward into the opening 116 defined by the window frame 114. The seating member 144 is adapted to receive a seal 146 that is retained in the seating member 144 as a result of a deformable section 150 of the seal 146 being positioned within an opening 152 formed in the seating member 144 of the upper and lower frame members 130a, 130b. Hence, the seal 146 is press-fit within the seating member 144 of the upper frame section 130a and lower frame section 130b. It will be appreciated that while the upper and lower frame sections 130a, 130b have been described as being comprised of a plurality of discrete components, in the illustrated embodiment, the upper frame section 130a and the lower frame section 130b are comprised of a single uniform component preferably formed of extruded or molded aluminum.

The pivoting members 140 are positioned on the inner surface 142 of the L-shaped section 132 so that the pivoting member 140 is positioned within the opening 116 of the window frame 114. The pivoting sections 127 and 128 of the retaining members 122 and 124 define an opening 141 that receives the pivoting member 140 to permit the pivoting movement of the retaining members 122 and 124. More particularly, the pivoting member 140 defines a ball 143 at its distal end that extends outwardly towards the outer surface of the window frame 114. Since the pivoting member 140 is positioned on the inside surface of the L-shaped section 132 of the frame 114, access to the interconnection between the retaining members 122 and 124 and the pivoting members is inhibited. Moreover, an end portion 145 of each of the retaining members 122, 124 is adapted to be flushly positioned within a recess 147 (FIGS. 3A and 3B) when the retaining members 122, 124 are in the closed position so that access to the interconnection between the retaining members 122, 124 is further inhibited. In this way, the likelihood of a person prying the retaining members 122, 124 free from the pivoting members 140 and thereby dismantling or damaging the window protector assembly 112 is inhibited.

As is illustrated in FIGS. 3A and 3B, the first retaining member 122 and the second retaining member 124 can be pivoted about the pivoting members 140 so as to extend outward from the opening 116. This allows a protective sacrificial sheet 156 to be positioned within the opening 116 on the seal 146. Subsequently, one or more pieces of glazing 120 can be positioned on an inner surface 160 of the protective sheet 156 in the manner shown in FIGS. 3A and 3B. Subsequently, an inner sacrificial protective sheet 162 can be positioned on an inner surface 164 of the glazing 120. The first and second retaining members 122, 124 can then be pivoted into the closed position as shown in FIG. 3B. The first and second retaining members 122, 124 further include an inner seal 166 which extends entirely around the perimeter of the opening 116 so that the inner seal 166 makes contact with the inner sacrificial protective sheet 162 in the manner shown in FIG. 3B.

Figure 4:
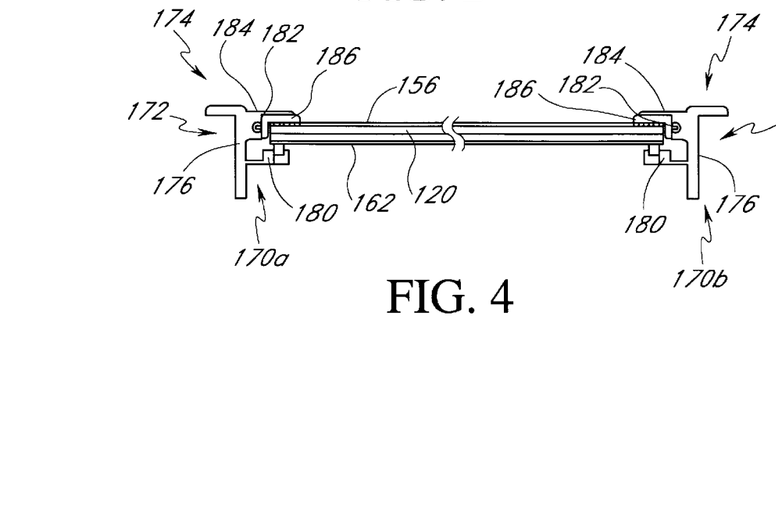
FIG. 4 is a cross-sectional view of the window protector assembly of FIG. 2 taken along the lines 4—4.

FIG. 4 is a cross-sectional view which illustrates the side frame sections 170a, 170b of the frame 114. The side frame sections 170a, 170b are integrally connected to the upper and lower frame sections 130a, 130b so that the entire frame 114 is a single integral piece. The side frame sections 170a, 170b are also configured to have an L-shaped section 172 that has a side wall member 174 that is adapted to be flushly positioned against the outer side wall 110 of the vehicle 100 adjacent the window opening 106. The L-shaped section 172 also has a laterally extending section 176 that extends inward through the opening 116 of the frame 114 in the same manner as the laterally extending section 136 of the upper and lower frame sections 130a, 130b as described above. A bracing member 180 extends inwardly into the opening 116 of the frame 114 so as to provide a bracing contact so that the first and second retaining members 122, 124 will be positioned adjacent the bracing member 180 when the retaining members 122, 124 are in the closed position. As is also illustrated in FIG. 4, the side frame sections 170a, 170b include a seating member 184 that extends inward into the opening 116 from the inner surface 182 of the laterally extending section 176. The seating member 184 is adapted to receive one or more seals 186 that extend laterally around the perimeter of the window.

As illustrated in FIGS. 3A and 4, the protective sacrificial sheet 156 is positioned adjacent a seal 186 which is retained in the side frame members 170a, 170b in substantially the same manner as discussed above in connection with the seal 146 and the upper and lower frame members 130a, 130b. The glazing 120 is then positioned adjacent the outer sacrificial layer 156 and the inner protective sheet 162 is then positioned adjacent the inner surface 164 of the glazing 120 in the same manner as described above in connection with FIGS. 3A and 3B. As illustrated in FIG. 4, when the first and second pivoting retaining members 122, 124 are in the closed position, the one or more seals 166, are positioned adjacent the inner sacrificial protective sheet 162. In one embodiment, the window 110 is square in which case the seals are comprised of a plurality of pieces. In another embodiment, the window 110 is curved and the seals comprise a single seal.

Figure 5A:
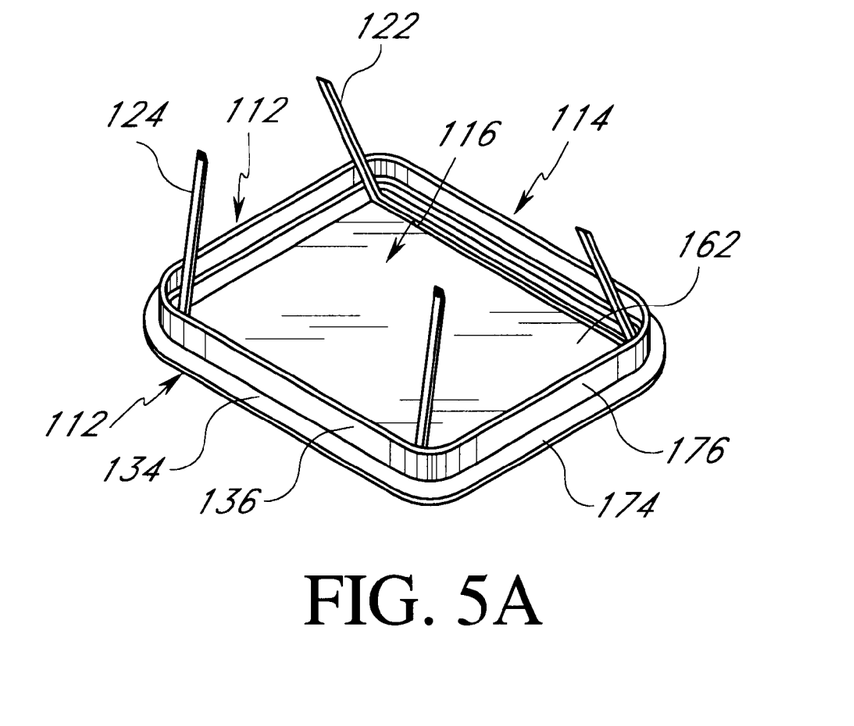
FIGS. 5A and 5B are perspective views of the window protector assembly of FIG. 2, illustrating the assembly in both a closed and an opened configuration.
Figure 5B:
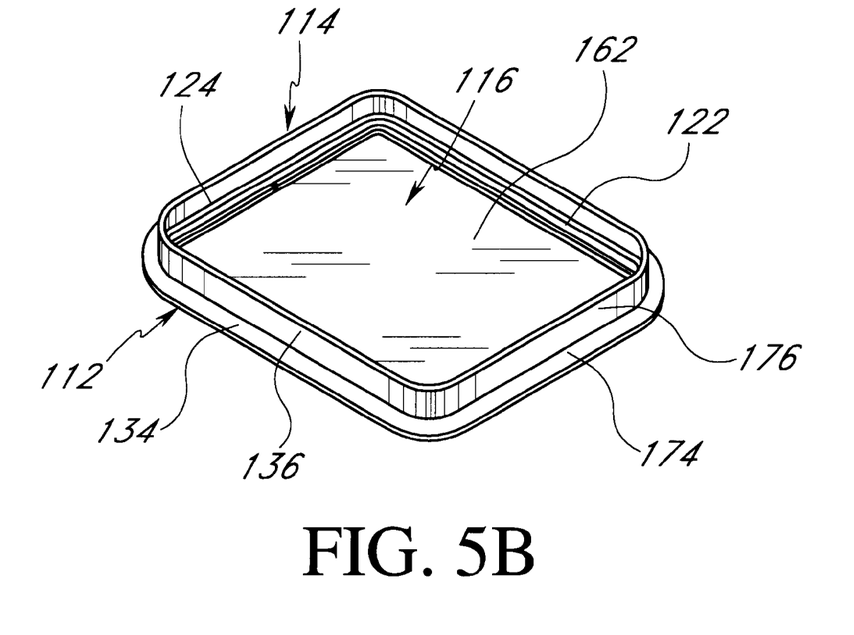

As is shown in FIGS. 2, 5A and 5B, the frame 114 is comprised of a single uniform piece that is comprised of the upper and lower sections 130a, 130b and the side sections 170a, 170b. The retaining members 122, 124 are pivotally attached and define retaining surfaces that extend about the outer perimeter of the opening 116 defined by the frame 114 so as to overlap the outer perimeter of the glazing 120 and the protective sheets 156, 162. The seating member 144 of the upper and lower frame sections 130a, 130b and the seating member 184 of the side frame sections 170a, 170b also extend into the opening 116 defined by the frame 114 so that the protective sheets 156, 162 and the glazing 120 can be securely retained in the opening 116 of the frame 114 by the retaining members 122, 124 pressing the protective sheets 156, 162 and the glazing 120 against the seating members 144, 184 about substantially the entire perimeter of the glazing 120 and the protective sheets 156, 162.

FIGS. 5A and 5B further illustrate the configuration and operation of the window protector assembly 112. In particular, as illustrated in FIG. 5A, the first and second retaining members 122, 124 are pivotable with respect to the upper and lower frame sections 130a and 130b thereby removing the first and second retaining members 122, 124 from the outer perimeter of the outer sacrificial layer 156, the glazing 120, and the inner sacrificial layer 162. This allows each of these layers to be lifted out of the opening 116 defined by the frame 114.

As shown in FIG. 5B, when the first and second retaining members 122, 124 are closed, they are positioned about the outer perimeter of the outer protective layer 156, the glazing 120 and the inner protective layer 162 thereby capturing these three layers adjacent the seal positioned on the inner sections of the frame 114. As the outer perimeter of the sacrificial protective layers 156, 162 and the glazing 120 is covered by the pivoting retaining members 122, 124, these layers cannot be removed without moving the first and second retaining members 122, 124 into the open position illustrated in FIGS. 3A and 5A. In this embodiment, the sacrificial protective layers 156 and 162 are comprised of an acrylic material that is adapted to be positioned adjacent the exposed surfaces of the glazing 120 such that the exposed surfaces of the glazing 120 on both the inside and the outside of the window is covered by the protective layers 156, 162. In this way, damage to the more expensive glazing 120 as a result of vandalism or defacement is inhibited as the protective acrylic layers provide protection against such damage.

Figure 6A:
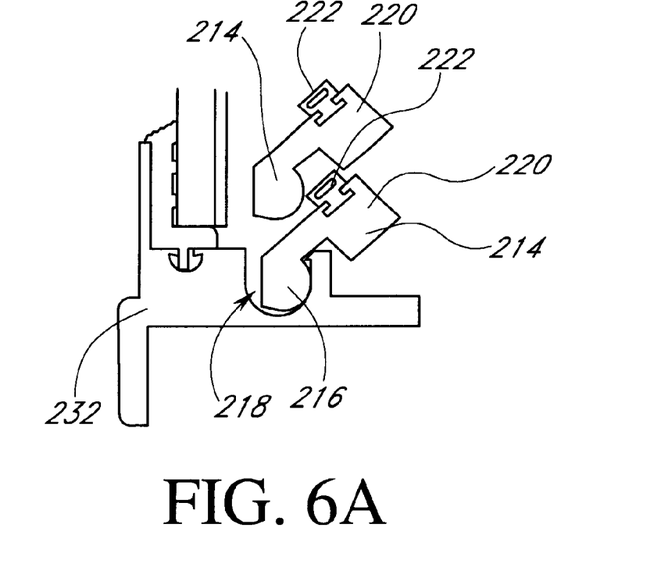
FIGS. 6A and 6B are cross-sectional views of another embodiment of the window protector assembly of FIG. 2 illustrating another interconnection between retaining members of the window protector assembly and the frame of the window protector assembly.
Figure 6B:
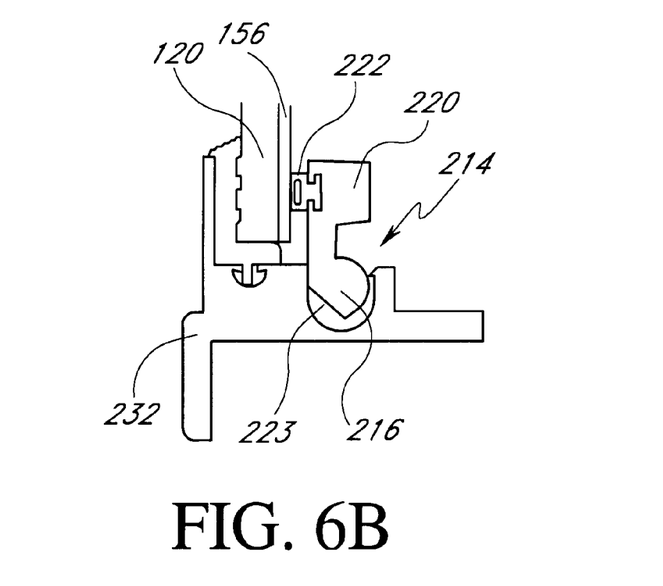

FIGS. 6A and 6B illustrate an alternate embodiment of the retaining members and their attachment to the frame of the window frame assembly. In particular, FIGS. 6A and 6B illustrate an alternate embodiment of the portions 127, 128 of the retaining members 122, 124 that pivotally attach the retaining members to the window frame. Specifically, in this embodiment, a retaining member 214 has a ball 216 formed on a first end that is adapted to be positioned within a recess 218 formed on an L-shaped section 232 of the frame. The embodiment of FIGS. 6A and 6B is substantially similar to the embodiment of FIGS. 3A and 3B except that the retaining members in this embodiment have the rotatable ball formed thereon and the recess is formed in the L-shaped section 232 of the frame as opposed to the other way around as described above in connection with FIGS. 3A and 3B.

As is also illustrated in FIGS. 6A and 6B, the retaining member has a seal portion 220 that receives a seal 222. The ball portion 216 is rotatable within the recess 218 between an open and a closed position. In the closed position, the radius of the ball 216 prevents removal of the retaining member 214 from the recess 218. However, the ball 218 has a flat surface 223 that decreases the radius of the ball 216 with respect to the opening of the recess 218 when the retaining member 214 has been moved to the open position as shown in FIG. 6A. Hence, the retaining member can be fully removed from engagement with the frame thereby permitting easy removal and installation of the retaining members.

When the retaining members are in the closed position, a securing mechanism, such as the mechanism illustrated in FIGS. 7 and 8 hereinafter can be used to secure the retaining members in the closed position. In the closed position, the seal 222 engages with the inner protective sheet 156 so as to secure the protective sheets and glazing within the window frame in substantially the same manner as described above.

Figure 7:
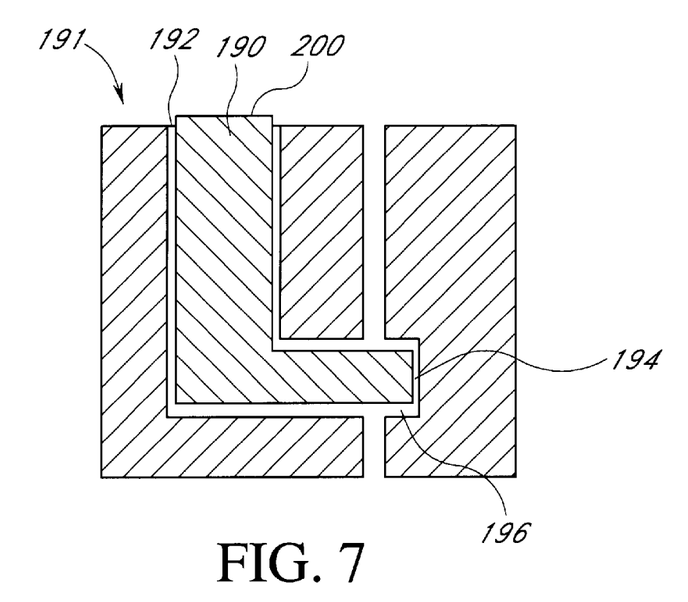
FIG. 7 is a side cross-sectional view of a securing mechanism of the assembly of FIG. 2.

FIG. 7 illustrates a securing mechanism 191 that is adapted to secure the first and second retaining members 122, 124 in a locked and closed position. In particular, as illustrated in FIGS. 3A and 3B, the outer edge of the arms 123a, 123b of the first retaining member 122 and outer edge of the arms 125a, 125b of the second retaining member 124 are beveled so that the outer tip 183 of the arms 125a, 125b of the second retaining member 124 is positioned over the outer tip 185 of the arms 123a, 123b of the first retaining member 122 when the first and second retaining members are positioned in the closed position in the manner shown in FIGS. 3B and 5B. A securing member 190 is positioned within an opening 192 in both the arms 125a, 125b of the second retaining member 124. Preferably, the securing member 190 is pivotable within the opening 192 such that a laterally extending arm 194 of the securing member 190 can be positioned within an opening 196 formed in a side wall of the frame 114.

In this embodiment, the opening 196 is preferably formed in the bracing member 180 and has a curved opening to permit the extending arm 194 to be rotated into the opening 196 in response to the user turning the securing member 190. As illustrated in FIG. 8, the securing member 190 is preferably pivotable between an opened position and a closed position wherein the laterally extending member 194 is positioned within the opening 196 and the frame 114 in the closed position and is retracted from the opening 196 in the opened position.

Figure 8:
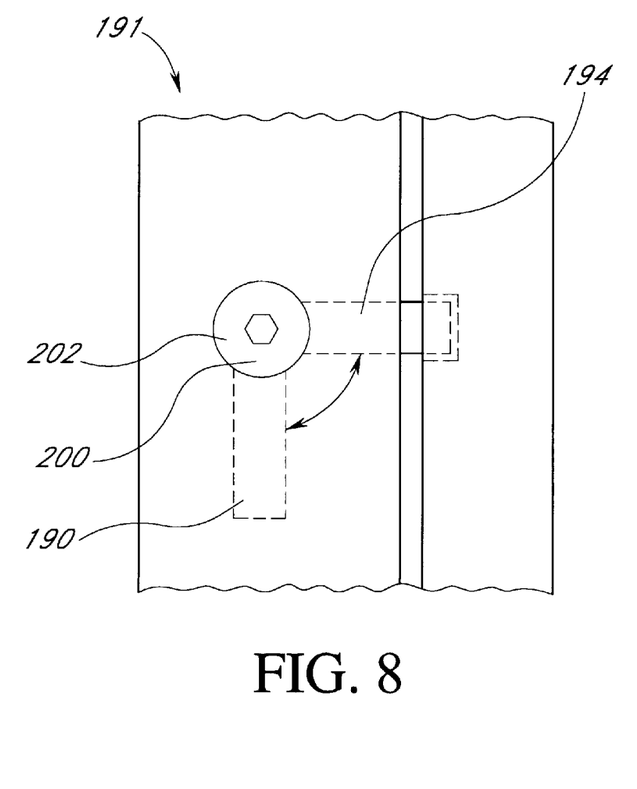
FIG. 8 is a top view of the securing mechanism of FIG. 2.

As is also illustrated in FIG. 8, the outer face 200 of the securing member 190 includes a tool recess 202 that is adapted to receive only a specially configured tool (not shown) such that manipulation of the securing member 190 between the opened and closed positions can preferably only be accomplished by an authorized person possessing a specially configured tool. As is illustrated in FIG. 2, there are preferably two securing members 190 positioned in both of the outer ends of the arms 125a, 125b of the second retaining member 124 to secure the second retaining member 124 in the closed position adjacent the frame 114. As discussed above, because the outer end 183 of the second retaining member 124 overlaps the outer end 185 of the first retaining member 122, securing the second retaining member 124 in the closed position against the frame 114 in the manner shown in connection with FIGS. 7 and 8 results in the first retaining member 122 similarly being secured in the closed position.

Advantageously, it is simple to remove and replace the inner sacrificial layer 162 and the outer sacrificial layer 156 and the glazing 120 by simply manipulating the retaining members 122, 124 into the open position and extracting each of the layers positioned within the opening 116 of the frame 114. Hence, the window protector assembly 112 of the illustrated embodiment allows for simpler and easier replacement of the protective layers 156, 162 and the glazing 120 as compared to similar protective devices of the prior art. As a result of permitting such easy access and replacement, it is now possible to have a protective layer positioned on the outer surface of the glazing 120 in addition to a protective surface on the inner surface of the glazing 120. However, it will also be appreciated that the window frame and protector 112 of the present invention can be used with only an inner protective layer 162 without departing from the spirit of the present invention.

Hence, the window protector 112 of the present invention allows for easier replacement of protective sheets as compared to window protective devices of the prior art. This easier access facilitates the use of a protective layer on the outside surface of the glazing as replacement of this sheet is now simplified due to the ease of access provided by the window protector assembly of the preferred embodiment.

Figure 9:
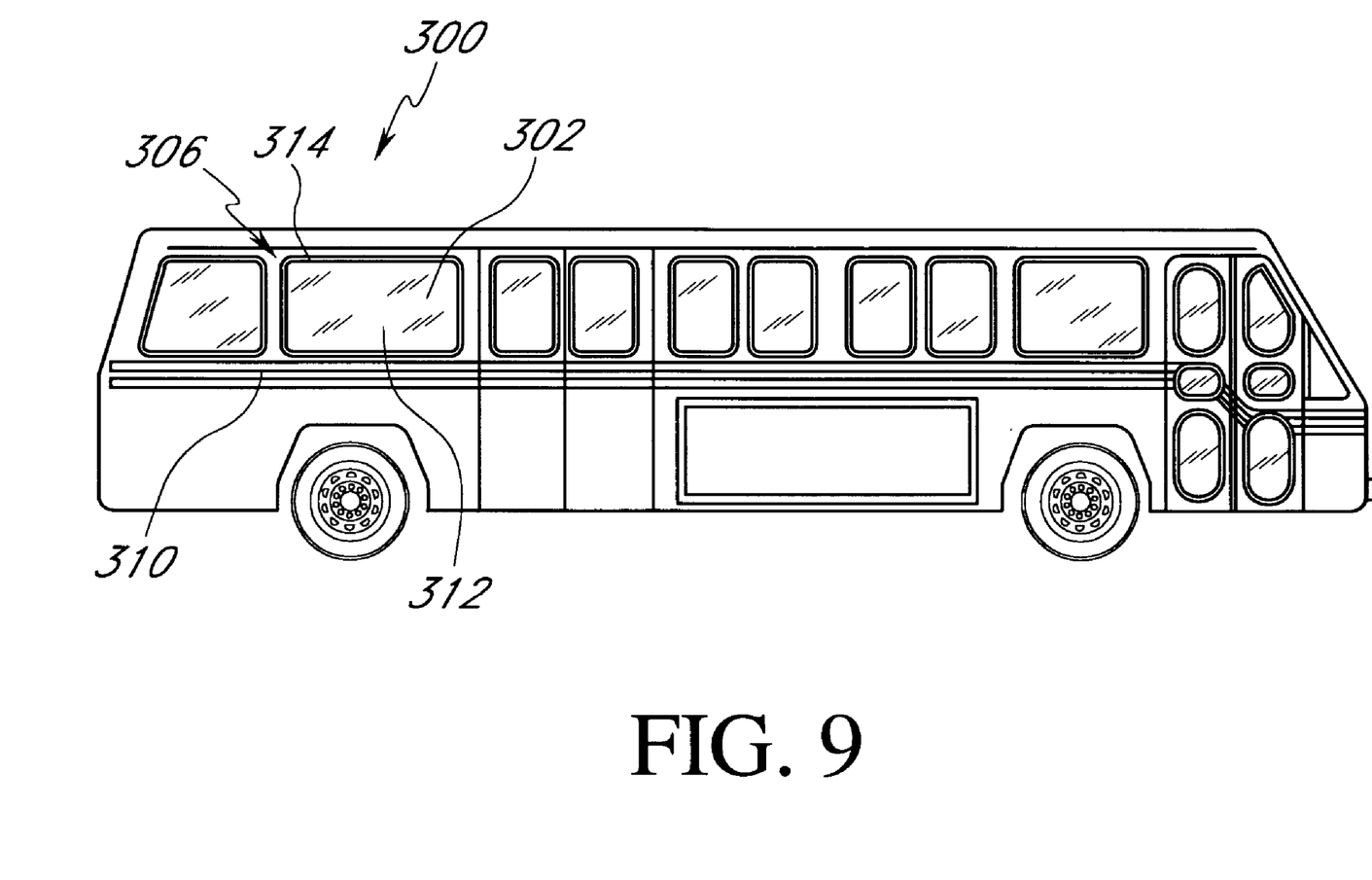
FIG. 9 is an elevational view of another embodiment of a public transportation vehicle incorporating windows having another embodiment of a window protector assembly of the present invention.

FIG. 9 illustrates another embodiment of an exemplary public transportation vehicle 300 that incorporates windows 302 having window frames 314 mounted within openings 306 in the side wall 310 of the vehicle 300. It will be appreciated from the following discussion that, while the window protector assembly of this embodiment is described in connection with a bus, that the window protector assembly 312 can be used in a number of different applications. These applications include other types of public transportation vehicles and also windows that are positioned in fixed environments, such as buildings, where the window is likely to be accidentally or intentionally damaged or defaced. As will also be apparent from the following discussion, the window protector assembly of the preferred embodiment is designed to both protect the glazing of the window and also to facilitate rapid change and replacement of protective sheets and the glazing of the window protector assembly.

Figures 10, 11A, 11B, 12:
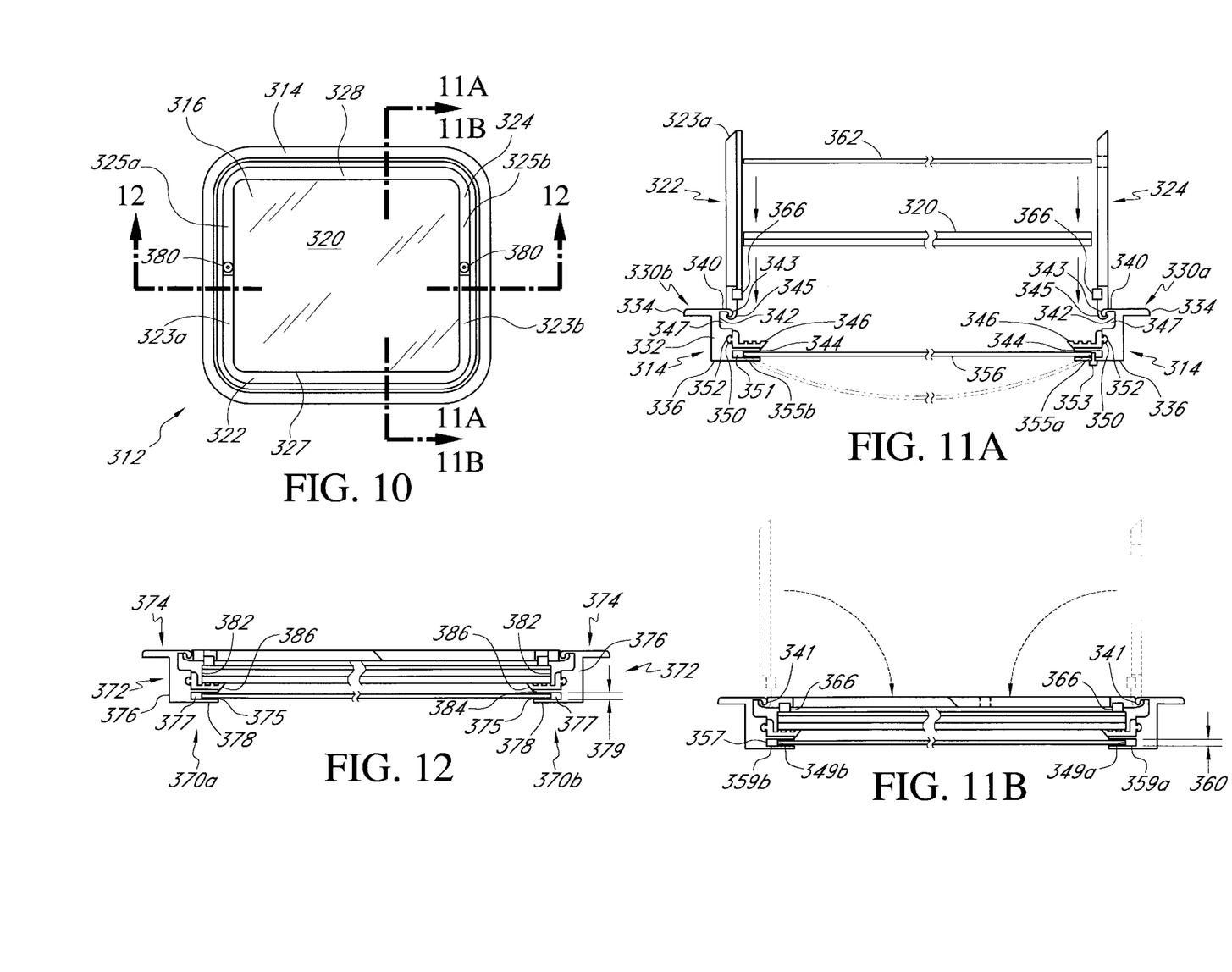
FIG. 10 is an outside elevational view illustrating the window protector of FIG. 9.
FIGS. 11A and 11B are cross-sectional views of the window protector assembly of FIG. 10 taken along the lines of 11—11.
FIG. 12 is a cross-sectional view of the window protector assembly of FIG. 10 taken along the lines of 12—12.

FIG. 10 illustrates one embodiment of a window protector assembly 312. In this embodiment, the window protector assembly 312 incorporates a frame 314 that is adapted to mount within the opening 306 in the side wall 310 of the vehicle 300 in a well-known manner. The frame 314 defines an opening 316 into which one or more pieces of glazing 320 are to be positioned.

In this embodiment, a first retaining member 322 and a second retaining member 324 are pivotally mounted to the frame 314 so as to be positioned about the outer perimeter of the opening 316 in the frame 314. As is shown in FIG. 10, the first retaining member 322 is generally U-shaped having two arms 323a, 323b that extend along the side walls of the frame 314 and pivoting section 327. Similarly, the second retaining member 324 is also generally U-shaped having a pivoting section 328 and two arms 325a, 325b that also extend along the side walls of the frame 314 so as to engage with the two arms 323a, 323b of the first retaining member 322. The engagement between the arms 323a, 323b of the first retaining member 322 and the arms 325a, 325b of the second retaining member 324 secures the glazing and protective layers within the opening 316 of the frame 314 in a manner that will be described in greater detail below.

As will also be described in greater detail below in reference to FIGS. 13A and 13B, the pivoting section 327 of the first retaining member 322 and the pivoting section 328 of the second retaining member 324 are pivotally attached to the frame 314 so as to be pivotable between a closed position, as shown in FIGS. 10 and 12, and an opened position, as shown in FIG. 11A.

As is illustrated in FIGS. 10 and 11B, the retaining members 322, 324 open outward of the window so as to secure the glazing in the window frame. When the glazing is to be replaced, the retaining members 322, 324 are opened and the glazing is then removed towards the outside of the vehicle in the manner that will be described in greater detail hereinbelow, thereby greatly simplifying the replacement of damaged or defaced glazing.

As is shown in FIG. 10, when the retaining members 322, 324 are in a closed position, the retaining members 322, 324 cover the outer perimeter of the glazing 320 and any outer protective member. This is because the arms and pivoting sections of the retaining members 322, 324 are selected to have a width sufficient so as to fully cover the outer edge of the glazing 320 and any outer protective layers positioned within the opening 316 of the frame 314. As is shown in FIG. 12, when the retaining members 322, 324 are in an open position, the outer perimeter of the glazing 320 and any outer protective layer is exposed. With the outer perimeter of the glazing 320 exposed, the glazing 320 can be removed from the frame via the exterior surface of the vehicle in a known manner.

FIGS. 11A and 11B illustrate the interconnection between the first retaining member 322 and the second retaining member 324 and corresponding sections of the frame 314. In particular, as illustrated in FIGS. 11A and 11B, the frame 314 includes an upper frame section 330a and a lower frame section 330b. The upper and lower frame sections 330a, 330b have an L-shaped section 332 that is suitable for mounting in the opening 306 of the side wall 310 of the vehicle 300. In particular, the L-shaped section 332 has an exterior lip 334 that is adapted to mount flush against the outer surface of the side wall 310 of the vehicle adjacent the window openings 306. The L-shaped section 332 further includes a laterally extending member 336 that is adapted to be positioned adjacent the inner walls of the openings 306 in the side walls 310 of the vehicle so as to extend substantially through the opening 306.

A pivoting member 340 is formed on an inner wall 342 of the laterally extending member 336 so as to extend perpendicularly outward therefrom into the opening 316 defined by the frame 314. As will be described in greater detail below, the pivoting member 340 extends the full length of the upper frame section 330a and the lower frame section 330b, and provides a surface to which the pivoting section 327 of the first retaining member 322 and the pivoting section 328 of the second retaining member 324 can be respectively attached to the frame 314 of the window protector assembly 312.

The L-shaped section 332 also defines a seating member 344 that extends inward into the opening 316 defined by the window frame 314. The seating member 344 is adapted to receive a seal 346 that is retained in the seating member 344 as a result of a deformable section 350 of the seal 346 being positioned within an opening 352 formed in the seating member 344 of the upper and lower frame members 330a, 330b. Hence, the seal 346 is press-fit within the seating member 344 of the upper frame section 330a and the lower frame section 330b. The glazing 320 is preferably positioned within frame 314 so as to be positioned adjacent the seal 346. When the retainers 322, 324 are closed, the glazing 320 is compressed against the seal 346 such that the glazing seals the window so as to inhibit the entry of moisture or air from the outside environment into the interior of the vehicle. It will be appreciated that while the upper and lower frame sections 330a, 330b have been described as being comprised of a plurality of discrete components, in the illustrated embodiment, the upper frame section 330a and the lower frame section 330b are comprised of a single uniform component preferably formed of extruded or molded aluminum.

The pivoting members 340 are positioned on the inner surface 342 of the L-shaped section 332 so that the pivoting member 340 is positioned within the opening 316 of the window frame 314. The pivoting sections 327 and 328 of the retaining members 322 and 324 define an opening 341 that receives the pivoting member 340 to permit the pivoting movement of the retaining members 322 and 324. More particularly, the pivoting member 340 defines a ball 343 at its distal end that extends outwardly toward the center of the window 302. Since the pivoting member 340 is positioned on the inside surface of the L-shaped section 332 of the frame 314, access to the interconnection between the retaining members 322 and 324 and the pivoting member 340 is inhibited. Moreover, an end portion 345 of each of the retaining members 322, 324 is adapted to be flushly positioned within a recess 347 (FIGS. 11A and 11B) when the retaining members 322, 324 are in the closed position so that access to the interconnection between the retaining members 322, 324 is further inhibited. In this way, the likelihood of a person prying the retaining members 322, 324 free from the pivoting member 340 and thereby dismantling or damaging the window protector assembly 312 is inhibited.

As is illustrated in FIGS. 11A and 11B, the first retaining member 322 and the second retaining member 324 can be pivoted about the pivoting members 340 so as to extend outward from the opening 316. This allows one or more pieces of glazing 320 to be positioned within the opening 316 on the seal 346. Subsequently, an outer sacrificial protective sheet 362 can be positioned on an outer surface 364 of the glazing 320. The first and second retaining members 322, 324 can then be pivoted into the closed position as shown in FIG. 11B. The first and second retaining members 322, 324 further include an inner seal 366 which extends entirely around the perimeter of the opening 316 so that the inner seal 366 makes contact with the outer sacrificial protective sheet 362. Once contact is made between the seal 366 and the outer sacrificial protective sheet 362, the outer sacrificial protective sheet 362 in turn contacts the glazing 320 which contacts the seal 346 which is rigidly attached to the rest of the frame 314. Thus, by closing the retaining members 322, 324, the outer sacrificial protective sheet 362 and the glazing 320 are held rigidly inside the frame 314. However, it will be appreciated that both the outer sacrificial protective sheet 362 and the glazing are easily removable once the retaining members 322, 324 are opened.

Advantageously, because the retaining members 322, 324 open only to the outside of the vehicle, passengers would be unable to open the retaining members 322, 324. This significantly reduces the abilities of a vandal to dismantle or damage the window protector assembly 312 from the inside of the vehicle, where vandalism is most likely to occur. Furthermore, passengers would be unable to open the retaining members 322, 324 to gain access to the fragile and expensive glazing 320. Hence, because the retaining members 322, 324 open only to the outside, the cost of repairing the effects of vandalism is decreased while the safety of the other passengers is increased.

Furthermore, as illustrated in FIGS. 11A and 11B, the upper and lower frame sections 330a, 330b include an upper and lower flange 355a, 355b that extends toward the center of the opening 316 defined by the window frame 314. The upper and lower flanges 355a, 355b are positioned on the interior surface of the window frame 314, lying parallel to the seating member 344 and to the plane of the glazing 320. The upper and lower flanges 355a, 355b are separated from the seating member 344 by a distance 360 so as to define an upper and lower recess 359a, 359b.

In the preferred embodiment of the window protector assembly 312, an inner sacrificial protective sheet 356 resides in the upper and lower recesses 359a, 359b. To install the inner sacrificial sheet 356, the inner sacrificial protective sheet 356 should be flexible enough such that the edges of the inner sacrificial protective sheet 356 can be bent over the upper and lower flanges 355a, 355b and into the upper and lower recesses 359a, 359b without breaking.

In one embodiment, a gasket 351 is positioned on the bottom surface 357 inside the lower recess 359b. Preferably, the gasket 351 is of such a thickness that it centers the inner sacrificial protective sheet 356 inside the window protector assembly 312. Also in this embodiment, one or more retainer fasteners 353 are drilled perpendicularly through the upper flange 355a, at a location above the upper edge 349a of the inner sacrificial protective sheet 356. Preferably, the retainer fasteners 353 lie close enough to the upper edge 349a such that the retainer bolts 353 prevent the inner sacrificial protective sheet 356 from shifting inside the recess 359. Also in the preferred embodiment, the fasteners 353 are removable only with a special tool such that a passenger would not be able to remove the fasteners 353 easily.

Preferably, the distance measured between a lower edge 349b of the inner sacrificial protective sheet 356 to the top of the lower flange 355b is less than the distance measured between an upper edge 349a of the inner sacrificial protective sheet 356 to the base of the upper flange 355a. Thus, after the retainer fasteners 353 are removed, the inner sacrificial protective sheet 356 can be shifted upwards until the lower edge 349b of the inner sacrificial protective sheet 356 is exposed. Then, in order to remove the inner sacrificial protective sheet 356 from the window protection assembly 312, the lower edge 349b could be grasped in order to bend the inner sacrificial protective sheet 356 out of the upper and lower recesses 359a, 359b. Advantageously, this embodiment of the widow protector assembly 312 allows for quick installation and removal of the inner sacrificial protective sheet 356, yet the addition of the fasteners 353 prevents a passenger from shifting and removing the protective sheet 356.

FIG. 12 is a cross-sectional view illustrating the side frame sections 370a, 370b of the frame 314. The side frame sections 370a, 370b are integrally connected to the upper and lower frame sections 330a, 330b so that the entire frame 314 is a single integral piece. The side frame sections 370a, 370b are configured to have an L-shaped section 372 that has a side wall member 374 that is adapted to be flushly positioned against the outer side wall 310 of the vehicle 300 adjacent the window opening 306. The L-shaped section 372 also has a laterally extending section 376 that extends inward through the opening 316 of the frame 314 in the same manner as the laterally extending section 336 of the upper and lower frame sections 330a, 330b as described above. As is also illustrated in FIG. 12, the side frame sections 370a, 370b include a seating member 384 that extends inward into the opening 316 from the inner surface 382 of the laterally extending section 376. The seating member 384 is adapted to receive one or more seals 386 that extend laterally around the perimeter of the window. Finally, as illustrated in FIG. 12, the side frame sections 370a, 370b include a flange 378 that extends inward into the opening 316 from the inner surface 382 of the laterally extending section 376. The flange 378 extends parallel to the seating member 384, and the flange 378 and the seating member 384 are separated at a distance 379 to define a recess 375.

As illustrated in FIGS. 11A and 12, the glazing 320 is positioned adjacent a seal 386 which is retained in the side frame members 370a, 370b in substantially the same manner as discussed above in connection with the seal 346 and the upper and lower frame members 330a, 330b. The outer sacrificial layer 362 is then positioned adjacent the glazing 320 in the same manner as described above in connection with FIGS. 11A and 11B. As illustrated in FIG. 12, when the first and second pivoting retaining members 322, 324 are in the closed position, the one or more seals 366, are positioned adjacent the outer sacrificial protective sheet 362. In one embodiment, the window 310 is square in which case the seals are comprised of a plurality of pieces. In another embodiment, the window 310 is curved and the seals comprise a single seal.

Also as illustrated in FIGS. 11A and 12, the inner sacrificial protective sheet 356 is positioned inside the recess 375 in the same manner as described above in connection with the upper and lower recesses 359a, 359b. In addition, a gasket 377 resides inside the recess 375 in order to center the inner sacrificial protective sheet 356 in the window protector assembly 312.

Figure 13A:
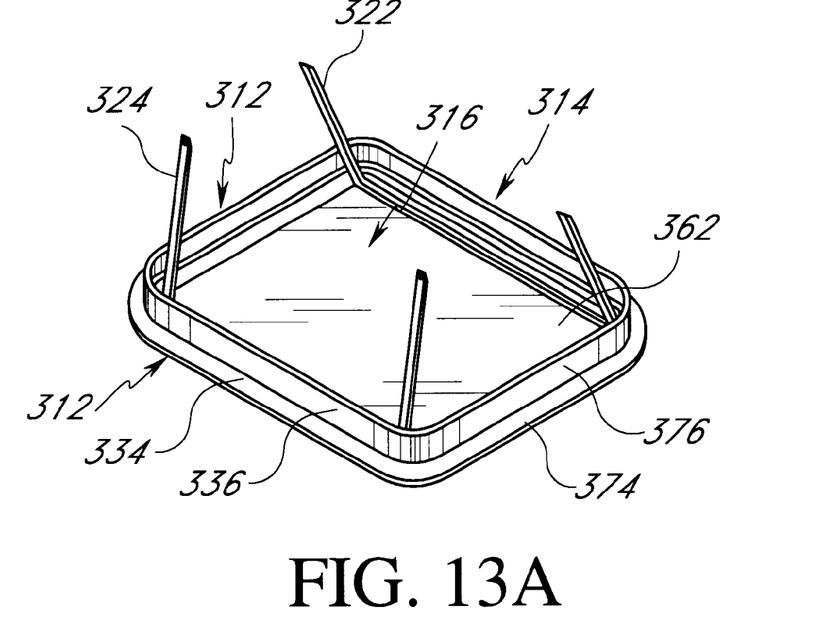
FIG. 13A and 13B are perspective views of the window protector assembly of FIG. 10, illustrating the assembly in both a closed and an opened configuration.
Figure 13B:
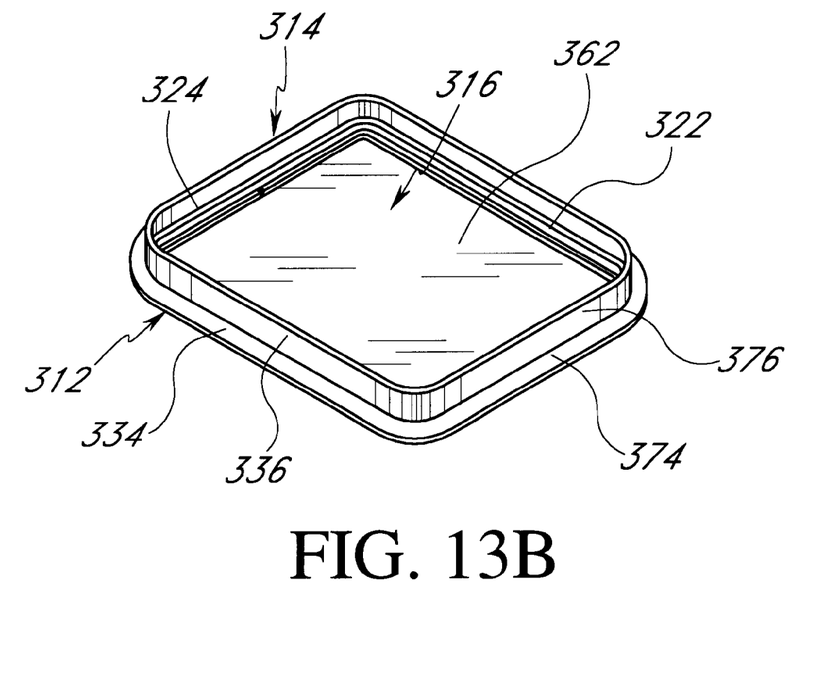

As is shown in FIGS. 10, 13A and 13B, the frame 314 is comprised of a single uniform piece that is comprised of the upper and lower sections 330a, 330b and the side sections 370a, 370b. The retaining members 322, 324 are pivotally attached and define retaining surfaces that extend about the outer perimeter of the opening 316 defined by the frame 314 so as to overlap the outer perimeter of the glazing 320 and the outer protective sheet 362. The seating member 344 of the upper and lower frame sections 330a, 330b and the seating member 384 of the side frame sections 370a, 370b also extend into the opening 316 defined by the frame 314 so that the outer protective sheet 362 and the glazing 320 can be securely retained in the opening 316 of the frame 314 by the retaining members 322, 324 pressing the outer protective sheet 362 and the glazing 320 against the seating members 344, 384 about substantially the entire perimeter of the glazing 320 and the protective sheet 362.

FIGS. 13A and 13B further illustrate the configuration and operation of the window protector assembly 312. In particular, as illustrated in FIG. 13A, the first and second retaining members 322, 324 are pivotable with respect to the upper and lower frame sections 330a and 330b thereby removing the first and second retaining members 322, 324 from the outer perimeter of the outer sacrificial layer 362 and the glazing 320. This allows each of these layers to be lifted out of the opening 316 defined by the frame 314.

As shown in FIG. 13B, when the first and second retaining members 322, 324 are closed, they are positioned about the outer perimeter of the outer protective layer 362 and the glazing 320 thereby capturing these two layers adjacent the seal positioned on the inner sections of the frame 314. As the outer perimeter of the sacrificial protective layer 362 and the glazing 320 is covered by the pivoting retaining members 322, 324, these layers cannot be removed without moving the first and second retaining members 322, 324 into the open position illustrated in FIGS. 11A and 13.

In this embodiment, the sacrificial protective layers 356 and 362 are comprised of an acrylic material that is adapted to be positioned adjacent the exposed surfaces of the glazing 320 such that the exposed surfaces of the glazing 320 on both the inside and the outside of the window is covered by the protective layers 356, 362. In this way, damage to the more expensive glazing 320 as a result of vandalism or accident is inhibited as the protective acrylic layers provide protection against such damage.

It should be noted that the alternate embodiment of the retaining members and their attachment to the frame described supra and illustrated in FIGS. 6A and 6B can be fully incorporated into this alternate embodiment of the window protector assembly 312.

Figure 14:
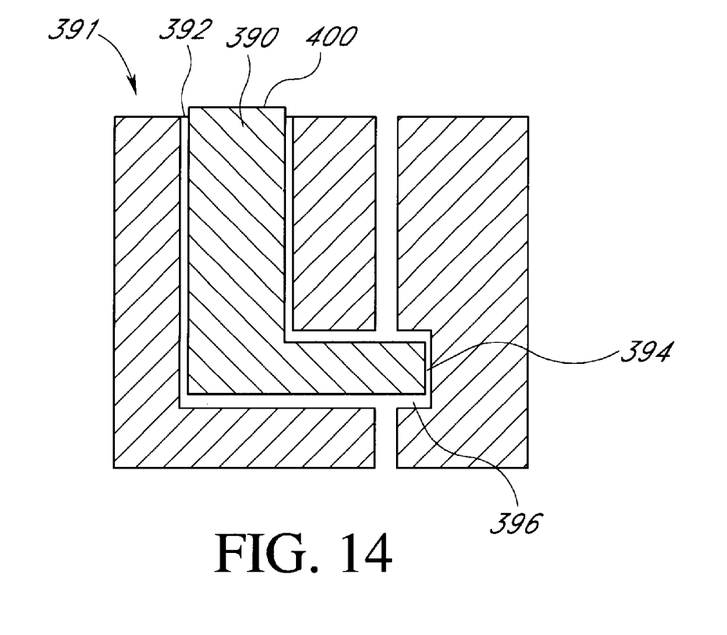
FIG. 14 is a side cross-sectional view of a securing mechanism of the assembly of FIG. 10.

FIG. 14 illustrates a securing mechanism 391 that is adapted to secure the first and second retaining members 322, 324 in a locked and closed position. In particular, as illustrated in FIGS. 11A and 11B, the outer edge of the arms 323a, 323b of the first retaining member 322 and outer edge of the arms 325a, 325b of the second retaining member 324 are beveled so that the outer tip 383 of the arms 325a, 325b of the second retaining member 324 is positioned over the outer tip 385 of the arms 323a, 323b of the first retaining member 322 when the first and second retaining members are positioned in the closed position in the manner shown in FIGS. 11 and 13. A securing member 390 is positioned within an opening 392 in both the arms 325a, 325b of the second retaining member 324. Preferably, the securing member 390 is pivotable within the opening 392 such that a laterally extending arm 394 of the securing member 390 can be positioned within an opening 396 formed in a side wall of the frame 314.

Figure 15:
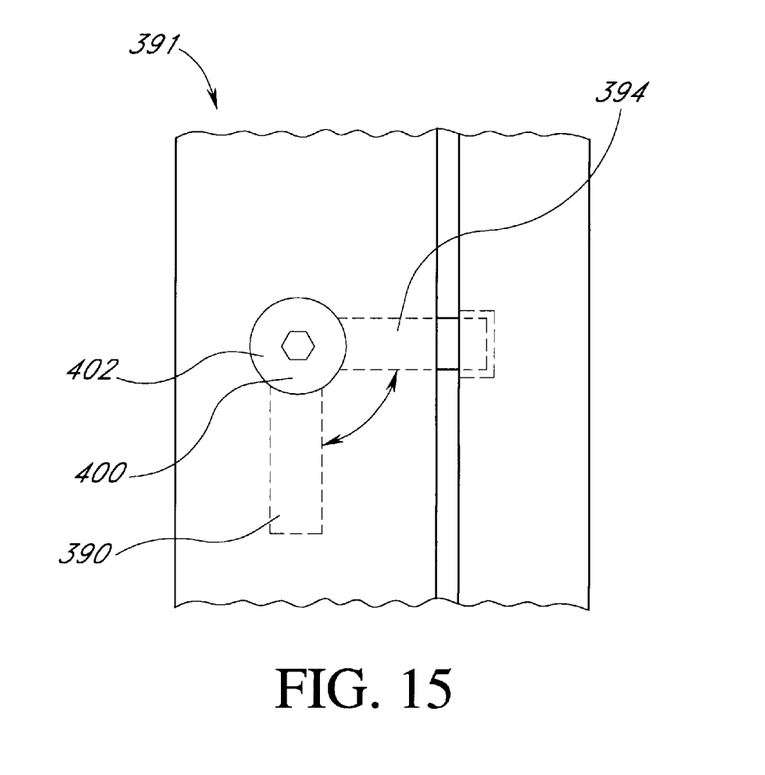
FIG. 15 is a top view of the securing mechanism of FIG. 10.

In this embodiment, the opening 396 is preferably formed in the bracing member 380 and has a curved opening to permit the extending arm 394 to be rotated into the opening 396 in response to the user turning the securing member 390. As illustrated in FIG. 15, the securing member 390 is preferably pivotable between an opened position and a closed position wherein the laterally extending member 394 is positioned within the opening 396 and the frame 314 in the closed position and is retracted from the opening 396 in the opened position.

As is also illustrated in FIG. 15, the outer face 400 of the securing member 390 includes a tool recess 402 that is adapted to receive only a specially configured tool (not shown) such that manipulation of the securing member 390 between the opened and closed positions can preferably only be accomplished by an authorized person possessing a specially configured tool. As is illustrated in FIG. 10, there are preferably two securing members 390 positioned in both of the outer ends of the arms 325a, 325b of the second retaining member 324 to secure the second retaining member 324 in the closed position adjacent the frame 314. As discussed above, because the outer end 383 of the second retaining member 324 overlaps the outer end 385 of the first retaining member 322, securing the second retaining member 324 in the closed position against the frame 314 in the manner shown in connection with FIGS. 14 and 15 results in the first retaining member 322 similarly being secured in the closed position.

Advantageously, it is simple to remove and replace the outer sacrificial layer 362 and the glazing 320 by simply manipulating the retaining members 322, 324 into the open position and extracting each of the layers positioned within the opening 316 of the frame 314. Likewise, it is simple to remove and replace the inner sacrificial layer 356 by shifting the sacrificial layer 356 until its edge 349b is exposed and then grasping the edge 349b and pulling on it until the sacrificial layer 356 bends out of the recesses 359a, 359b, 375. Hence, the window protector assembly 312 of the illustrated embodiment allows for simpler and easier replacement of the protective layers 356, 362 and the glazing 320 as compared to similar protective devices of the prior art. As a result of permitting such easy access and replacement, it is now possible to have a protective layer positioned on the outer surface of the glazing 320 in addition to a protective surface on the inner surface of the glazing 320. However, it will also be appreciated that the window frame and protector 312 of the present invention can be used with only an inner protective layer 356 without departing from the spirit of the present invention.

Hence, the window protector 312 of the present invention allows for easier replacement of protective sheets as compared to window protective devices of the prior art. This easier access facilitates the use of a protective layer on the outside surface of the glazing as replacement of this sheet is now simplified due to the ease of access provided by the window protector assembly of the preferred embodiment.

Although the illustrated embodiments of the present invention have shown, described and pointed out the fundamental novel features of the invention, as applied to these embodiments, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A window assembly mounted in a wall of a vehicle having an interior and an exterior surface, the assembly comprising:
    a frame that is adapted to be positioned within the wall of the vehicle wherein the frame includes a transverse surface that extends through an opening in the wall and defines a window opening and an external perpendicular surface that is positioned adjacent the external surface of the wall of the vehicle when the frame is positioned within the wall wherein the frame defines a glazing mounting location on the transverse surface when the frame is positioned in the wall of the vehicle;
    a piece of glazing positioned at the glazing mounting location within the frame of the vehicle so as to occupy the window opening, wherein the glazing mounting location is configured so as to inhibit the piece of glazing from moving inwards towards the interior surface of the wall of the vehicle but permits the piece of glazing to be removed from the frame adjacent the exterior surface of the wall of the vehicle when the frame is positioned within the wall of the vehicle;
    at least one retaining member pivotally attached to the frame so as to pivot outward from the exterior surface of the vehicle when the frame is positioned within the wall of the vehicle wherein the at least one retaining member is movable between an open position and a closed position such that the at least one retaining member in the open position allows the piece of glazing to be removed from the window opening of the frame adjacent the exterior surface of the wall of the vehicle and such that the at least one retaining member in the closed position retains the piece of glazing in the glazing mounting location in the closed position.

2. The assembly of claim 1, wherein the frame also defines a protective mounting location adjacent the interior surface of the vehicle when the frame is positioned in the wall of the vehicle.

3. The assembly of claim 2, further comprising a protective sheet mounted at the protective mounting location so as to be interposed between the interior surface of the vehicle and the piece of glazing to thereby inhibit damage or defacement to the piece of glazing by occupants of the vehicle positioned adjacent the interior surface of the vehicle.

4. The assembly of claim 3, wherein the protective mounting location comprises at least a recess that extends substantially about at least two opposed sides of the window opening such that the protective sheet can be positioned within the recess.

5. The assembly of claim 4, wherein the recess is sized and positioned about the window opening and the protective sheet is sized such that when the protective sheet is positioned within the recess, the protective sheet can be moved in a first direction with respect to the recess such that a first edge of the protective sheet can be exposed from the recess to thereby permit removal of the protective sheet.

6. The assembly of claim 5, further comprising a retainer that extends into the recess so as to inhibit movement of the protective sheet in the first direction so as to prevent the first edge of the protective sheet from being exposed from the recess so that the retainer inhibits removal of the protective sheet without previous removal of the retainer.

7. The assembly of claim 6, wherein the protective sheet comprises a sheet of acrylic material.

8. The assembly of claim 1, wherein the window opening of the frame has a first perimeter and wherein frame further includes a seating member that extends inward from the transverse surface of the frame into the window opening so as to define the glazing mounting location.

9. The assembly of claim 8, wherein the at least one retaining member is comprised of a first and a second U-shaped retaining members that are pivotally attached to the frame so as to extend substantially around the first perimeter of the frame when in the closed position.

10. The assembly of claim 9, wherein the first and second U-shaped retainers have first and second arms with beveled ends, wherein the beveled ends of the first and second arms of the first U-shaped retainer are positioned underneath the beveled ends of the first and second arms of the second U-shaped retainer when the first and second U-shaped retainers are in the closed position.

11. The assembly of claim 10, wherein at least one securing device is attached to the first U-shaped retainer so as to retain the first U-shaped retainer in the closed position.

12. The assembly of claim 11, wherein the first U-shaped retainer has at least one opening and wherein the securing device comprises a securing member mounted within the at least one opening in the first U-shaped retainer so as to be rotatable therein and wherein the securing member further includes a lateral member that rotates between a first position when the lateral member engages with the frame to retain the first U-shaped retainer in the closed position and a second position wherein the lateral member disengages with the frame to permit the first and second U-shaped members to be moved into the opened position.

13. The assembly of claim 12, wherein the securing member has a first exposed face that has an opening adapted to receive a tool having a first configuration so that positioning the tool having the first configuration into the opening permits manipulation of the securing member between the first and second positions.

14. The assembly of claim 1, further comprising a protective sheet mounted between the glazing and the retaining member so as to be interposed between the exterior of the vehicle and the piece of glazing to thereby inhibit damage or defacement to the piece of glazing by persons or debris adjacent the exterior surface of the vehicle.

15. The assembly of claim 14, wherein the protective sheet comprises a sheet of acrylic material.

16. A method of protecting glazing in windows of mass transit vehicles, the method comprising:
    mounting the glazing in the window frame from an exterior surface of the vehicle;

securing the glazing in the window frame by manipulating a pivoting member attached to the window frame adjacent the external surface of the vehicle so as to secure the glazing against a surface in the window frame that inhibits the glazing from falling from the exterior of the mass transit vehicle; and positioning a protective sheet adjacent an interior surface of the vehicle so as to inhibit damage to the surface of the glazing adjacent the interior of the mass transit vehicle.

17. The method of claim 16, wherein positioning the protective sheet adjacent an interior surface of the vehicle comprises positioning the protective sheet in a recess about at least two opposed sides of the window opening and securing the protective sheet within the recess.

18. The method of claim 17, wherein positioning the protective sheet in the recess comprises positioning a protective sheet in the recess that is sized with respect to the recess such that the protective sheet can be moved within the recess to thereby expose an edge of the protective sheet to permit subsequent removal.

19. The method of claim 18, wherein securing the protective sheet within the recess comprises positioning a fastener in the recess that inhibits the movement of the protective sheet in a manner that exposes the edge of the protective sheet.

20. The method of claim 16 further comprising mounting a protective sheet in the window frame from the exterior surface of the vehicle.

* * * * *